(No Model.)

W. G. KING.
POLARISCOPE.

No. 324,560. Patented Aug. 18, 1885.

WITNESSES
N. S. Amstutz
G. O. Zhunnway

Walter G. King INVENTOR
By Jno. Crowell
Attorney

UNITED STATES PATENT OFFICE.

WALTER G. KING, OF CLEVELAND, OHIO.

POLARISCOPE.

SPECIFICATION forming part of Letters Patent No. 324,560, dated August 18, 1885.

Application filed May 26, 1885. (No model.)

*To all whom it may concern:*

Be it known that I, WALTER G. KING, of Cleveland, in the county of Cuyahoga and State of Ohio, have invented certain new and useful Improvements in Polariscopes; and I do hereby declare the following to be a full, clear, and exact description of the invention, such as will enable others skilled in the art to which it pertains to make and use the same.

My invention relates to polariscopes; and it consists in mechanism for bringing the axes of prisms or lenses in parallel or opposite meridian, my object being the production of an instrument for the polarization of light that will detect a pebble lens from an ordinary glass lens.

It is well known that common light consists of undulations in which the vibrations of each particle are in the plane perpendicular to the wave's motion. The polarization of light is the resolution of each vibration into two, one passing through the direction of the wave's motion and the other perpendicular to that plane. When we are able to separate one of these from the other, we say that the light of each is polarized. Light may be polarized, first, by reflection at a proper angle from the surface of transparent media; second, by transmission through crystals possessing the property of double refraction, and, third, by transmission through a sufficient number of uncrystallized transparent plates placed at proper angles.

In the construction of my polariscope I have chosen the second method, and make use of either Nichol's prisms or tourmaline lenses.

Figure 1:
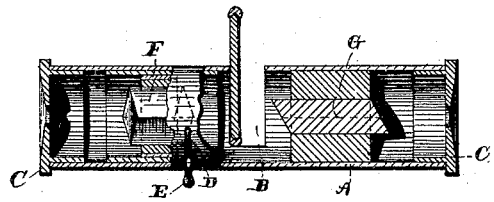
Figure 2:
Figure 3:
Figure 4:
Figure 5:
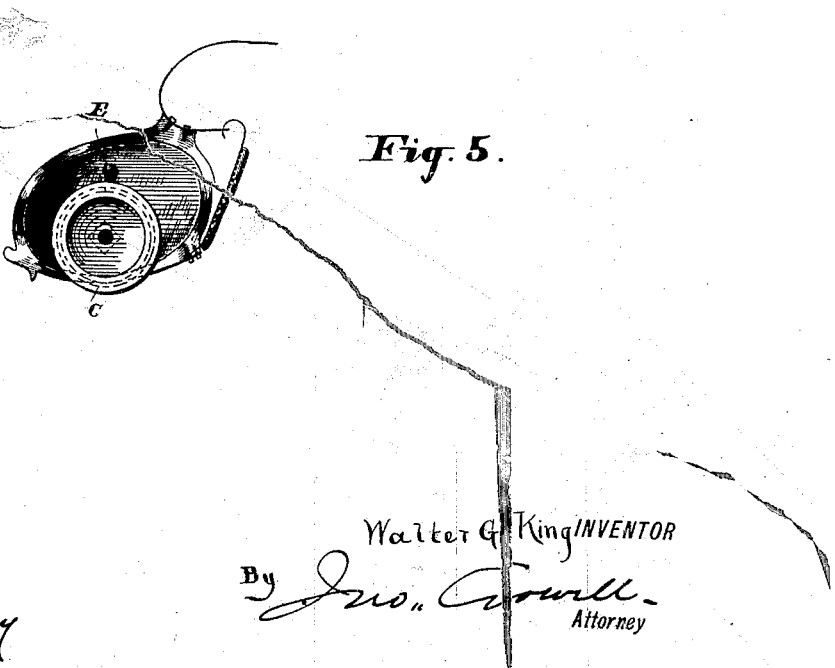

In the accompanying drawings, Figure 1 is a vertical horizontal sectional view of my instrument, with a portion of the case unbroken so as to show guideway of adjusting-lever. Fig. 2 is a detached perspective of smaller prism in its normal position as shown in section in Fig. 1. Fig. 3 is a detached perspective of larger prism in its operative position. Fig. 4 is a section of Fig. 3 on line $x\,x$. Fig. 5 is a view of mechanism in operative position.

A is a cylinder, of metal or other suitable material, having a central or transverse opening or notch, B, and closed at either end by eye-pieces C, having small apertures for the transmission of light. At D is another transverse notch extending to about one-quarter of the circumference of the tube A, for the reception of a pin or handle, E, for operating the mechanism holding one of the prisms.

F is a prism of schorl or tourmaline, Iceland spar, (Nichol prism,) or other double-refractive crystal, said prism being in the form of a rhomboid, and centered in a cylindrical frame revolving freely within case A by means of lever E to the extent of about a quarter of the circle. G is a similar but smaller prism fixed in case A so as to be immovable.

In Fig. 4, G, is shown a section of F on the line $x\,x$ in Fig. 3.

In Fig. 5 is shown the method of placing a lens in the polariscope for examination.

The operation of this instrument is very simple, it being understood that common glass will permit polarized light to pass only when the light falls at a certain angle, while crystal offers no obstruction. Now, if a glass lens is placed in the notch or recess B and the instrument turned toward the light, it will be observed on turning the handle E that at one end of the movement only a faint glimmer of light is perceptible. If the glass lens be now changed for one of crystal, little or no obstruction of the light will be perceived, though changes in the color may be observed.

From the above it will be seen that this instrument affords a certain, simple, and ready means for determining whether a lens is glass or crystal—often a matter of great importance to oculists and opticians.

What I claim is—

1. The combination of a single cylinder, A, formed with transverse opening B for the object to be examined, two prisms within said cylinder, and two eye-pieces, one of said prisms being fixed and the other movable, substantially as set forth.

2. The combination of a single cylinder, A, formed with transverse openings B and D, two eye-pieces, C C, a fixed prism between said opening B and one eye-piece, and an adjustable prism between said opening B and the other eye-piece, the adjustable prism having a handle extending through the opening D, substantially as set forth.

In testimony whereof I sign this specification, in the presence of two witnesses, this 18th day of May, 1885.

WALTER G. KING.

Witnesses:
G. W. SHUMWAY,
FREDK. KINSMAN.